Sept. 9, 1958     S. LEVY     2,850,854
METHOD FOR REMOVING MATERIAL
Filed Aug. 20, 1956
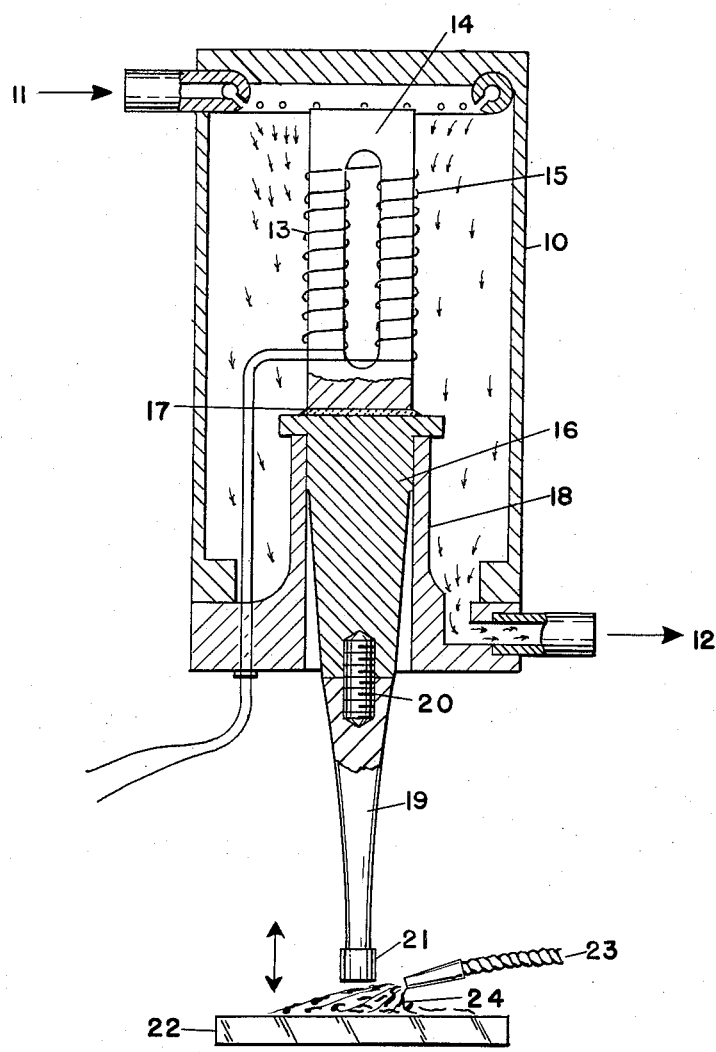
*INVENTOR:*
SIDNEY LEVY

2,850,854
Patented Sept. 9, 1958

2,850,854

METHOD FOR REMOVING MATERIAL

Sidney Levy, Garden City, N. Y.

Application August 20, 1956, Serial No. 605,066

9 Claims. (Cl. 51—281)

This invention relates to a method for removing material from a solid body and more particularly to a method of impact grinding materials.

It is an object of this invention to provide a method for impact grinding of materials which have heretofore not been susceptible to machining by this method and to increase the efficiency and rate of removal of material on substances which it has heretofore been found impractical to subject to this type of operation.

Other and further objects, benefits and advantages of this invention will become apparent from the description thereof contained in the annexed drawing, specification and claims or will otherwise become obvious. It will be understood that the invention herein disclosed may be employed for other purposes for which the parts, structure and arrangement are adapted.

In the accompanying drawing:

Figure 1 is a cross-section of an impact grinding arrangement which may be used in accordance with the instant invention.

The machining of various substances by means of the impact grinding process is well-known and has been described in technical literature and is the subject of a number of issued patents. Generally, in the process of impact grinding a tool is held in determinable position with respect to a suitably supported workpiece. A suspension of comminuted abrasive is interposed between the face of the workpiece and the end of the tool. The tool head and the workpiece are urged toward each other and means are provided for causing the end of the tool to oscillate relative to the workpiece in a direction having a major component of movement towards and away from the workpiece. The oscillation of the tool is effected at a relatively high frequency. By reason of the motion of the tool head the abrasive particles suspended in the liquid between the tool and the workpiece are driven against the workpiece to thereby remove material therefrom. An example of the method and apparatus employed in connection therewith is described in Patent No. 2,580,716. Although the results produced by this method of material removal are highly desirable, the process has heretofore been limited in the nature of materials to which it may be applied. Since the cutting action occurs by impact of the abrasive with the workpiece, it has been found that the process may be efficiently employed only in connection with non-yielding, brittle or readily fragmentable materials. Thus, the process has particular application for machining or cutting glass, ceramics, cemented carbides and normally brittle metals such as germanium. In a typical commercial application of this process apparatus such as that illustrated in Figure 1 is employed. The cutting tool is mounted in a casing designated generally by the numeral 10. The casing is provided with inlet and outlet ports 11 and 12 respectively for circulating water therethrough in order to cool apparatus therein contained. Mounted within the casing is a driver unit 13 comprising an electro-mechanical transducer. Said electro-mechanical transducer is formed of a laminated nickel stack 14 which is surrounded by an excitation coil 15 to which an alternating current of preferably ultrasonic frequency is fed from a source not shown. A typical frequency employed for this purpose is 25,000 cycles per second. Since nickel is magnetostrictive, the stack expands and contracts in accordance with the applied frequency. The nickel stack is suitably secured to a transmitting cone 16 as by means of a silver solder joint indicated by the numeral 17. The transducer driver unit is mounted within the casing upon a resonant support 18 which enables the vibrations to be transferred to the cutting tool without appreciable loss of energy and at the same time provides means for directing and controlling the cutting action. The lower end of the transmitting cone 16 has secured thereto a tool cone 19 by means of threaded stud 20. A cutting head or tool 21 of suitable configuration is brazed or similarly secured to the lower end of the tool cone 19 and is disposed in confronting relation with the workpiece 22. A conduit 23 feeds the fluid suspension of abrasive material 24 between the workpiece 22 and the operative face of the tool head 21.

In operation the oscillation of the tool head causes the abrasive particles to impinge upon the workpiece at a high rate of acceleration and consequently causes the abrasive to cut, chip or fragment portions of the workpiece directly below the operative face of the tool. As a consequence the workpiece is abraded to a configuration which is complementary to the configuration of the operative surface of the tool. The tool is formed of a softer material than the workpiece and is simultaneously abraded but to a lesser degree.

Table 1 shows the relative rate of removal of material from the workpiece as compared with the tool for various materials using cold-rolled steel tool:

Table 1

| Material: | Ratio of stock removed to tool wear |
|---|---|
| Glass | 100/1 |
| Ceramic | 75/1 |
| Germanium | 100/1 |
| Tungsten carbide | 1.5/1 |
| Tool steel | 1/1 |
| Mother of pearl | 100/1 |
| Synthetic ruby | 2/1 |
| Carbon-graphite | 100/1 |
| Ferrite | 100/1 |
| Quartz | 50/1 |
| Boron carbide | 2.5/1 |
| Glass-bonded mica | 100/1 |

320 grit boron carbide abrasive, cold-rolled steel tool.

The above data are derived from the typical grinding performance of a commercially available impact grinder at normal operating room temperature. It is obvious from the foregoing and the technical and patent literature that it is impractical to employ this process for machining normally yielding materials, such as steels, brass, plastics or other normally non-yielding or non-brittle materials.

It has been determined that by subjecting the workpiece to a low temperature the physical and mechanical characteristics of many normally non-brittle materials may be substantially altered to render them sufficiently non-yielding and brittle so that the impact grinding process may be efficiently and economically employed for machining purposes of the type hereinabove indicated. In connection with this process the tool head utilized is formed of a material which remains malleable and non-brittle at the thus reduced operating temperature. By the use of this combination of materials under conditions of refrigeration, the ratio of cutting rate to tool wear is materially increased and the process may be used for efficiently operating upon materials to which it has heretofore been found inapplicable. It is preferred to reduce the temperature of the workpiece in the immediate region of the grinding operation by suspending the abrasive material in a low temperature liquid. A suitable suspending medium for the abrasive is for example liquid nitrogen. The process is however not limited to this particular liquid suspending medium, but other forms of liquified gases or refrigerant fluids, such as Freon 12 may be employed for this purpose. It is of course also possible to operate the process by packing the workpiece with a refrigerant such as Dry Ice or by surrounding it with any other suitable refrigerating medium. The workpiece may also be immersed in a refrigerant such as liquid air and then upon having attained the desired low temperature, may be placed upon the workpiece support which may additionally be insulated to maintain the workpiece at the lowered temperature for an extended period of time. Where the workpiece itself is refrigerated, the liquid suspending medium for the abrasive must of course be such as will remain fluid at the operating temperature. Such suspending mediums are available; a typical suspending agent being a low freezing point silicone oil. Suitable materials for the tool head are copper, austenitic stainless steel, lead and aluminum. By the use of tool heads of the materials indicated it is possible to operate efficiently upon cold-rolled steel or high carbon tool steels, brass, zinc, plastics such as polyethylene and other materials having similar low temperature characteristics.

I have here shown and described a preferred embodiment of my invention. It will be apparent, however, that this invention is not limited to this embodiment and that many changes, additions and modifications can be made in connection therewith without departing from the spirit and scope of the invention as herein disclosed and hereinafter claimed.

I claim:

1. In the process of impact grinding wherein a tool is oscillated with respect to a workpiece in the presence of a suspension of a comminuted abrasive, the step of reducing the temperature of said workpiece below room temperature during the grinding operation whereby the impact resistance of said workpiece is reduced to thereby increase the cutting effect of said abrasive upon said workpiece.

2. In the process of impact grinding wherein a tool is oscillated with respect to a workpiece in the presence of a comminuted abrasive suspended in a fluid medium, the method of operating upon a workpiece formed of a material having characteristics yielding at room temperature which includes the step of reducing the temperature of said workpiece during the grinding operation below said temperature to thereby reduce the yielding characteristics of the workpiece material.

3. The process according to claim 2 wherein said step includes the suspension of said abrasive in a refrigerant.

4. The process according to claim 2 wherein said workpiece is immersed in a refrigerant immediately prior to being subjected to the grinding operation.

5. The process according to claim 4 wherein said suspending medium is fluent at the operating temperature of the workpiece.

6. The process according to claim 2 wherein the tool is formed of a material the yielding characteristics of which are not materially effected at the operating temperature.

7. In the method of removing material from a solid body to impart a predetermined contour to the treated region which consists in imparting to the end portion of an elongated tool member a contour corresponding in reverse to the contour desired, applying said tool endwise to the body to be treated while holding said tool and body against relative rotation, interposing between the tool and the work a liquid suspension of finely comminuted abrasive, engendering at the area of contact a relative oscillation of high frequency and minute amplitude and having a major component of movement in the direction of application of said tool and advancing the tool into the work as the abrasive progressively removes material from the work at the area of contact, the step of maintaining said work below ambient temperature during the removal process to thereby increase the ratio of material removed from said work to the wear on said tool member.

8. The method according to claim 7 wherein the work is maintained below ambient temperature by subjecting it to the action of a refrigerant.

9. In the process of impact grinding wherein a tool is oscillated with respect to a workpiece in the presence of a comminuted abrasive suspended in a fluid medium, the method of operating upon a workpiece formed of a material having characteristics yielding at room temperature which includes the step of reducing the temperature of said workpiece during the grinding operation by suspending said abrasive in liquid nitrogen to thereby reduce the yielding characteristics of the workpiece material.

References Cited in the file of this patent

UNITED STATES PATENTS

| | | |
|---|---|---|
| 2,452,211 | Rosenthal | Oct. 26, 1948 |
| 2,580,716 | Balmuth | Jan. 1, 1952 |